United States Patent
Shinogle

(10) Patent No.: US 7,028,928 B2
(45) Date of Patent: Apr. 18, 2006

(54) HARD COATING OF AN IMPACT SURFACE OF A SOLENOID ACTUATOR AND FUEL INJECTOR USING SAME

(75) Inventor: Ronald D. Shinogle, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 202 days.

(21) Appl. No.: 10/307,899

(22) Filed: Dec. 2, 2002

(65) Prior Publication Data

US 2004/0112993 A1 Jun. 17, 2004

(51) Int. Cl.
- *B05B 1/30* (2006.01)
- *F02M 47/02* (2006.01)
- *F02M 61/00* (2006.01)

(52) U.S. Cl. ............... 239/585.1; 239/585.3; 239/585.4; 239/585.5; 239/533.2; 239/533.11; 239/88

(58) Field of Classification Search .. 239/585.1–585.5, 239/533.2, 533.3, 533.11, 88–92, 1, 5; 251/129.15, 251/129.21, 127; 29/890.124, 890.127

See application file for complete search history.

(56) References Cited

U.S. PATENT DOCUMENTS

| | | | |
|---|---|---|---|
| 5,327,814 A * | 7/1994 | Custer et al. | 92/248 |
| 5,361,740 A * | 11/1994 | Pitzi | 123/321 |
| 5,479,901 A | 1/1996 | Gibson et al. | |
| 5,518,030 A * | 5/1996 | Liu et al. | 137/625.65 |
| 6,048,586 A * | 4/2000 | Burris et al. | 427/446 |
| 6,161,770 A | 12/2000 | Sturman | |
| 6,508,416 B1 * | 1/2003 | Mastro et al. | 239/585.1 |

FOREIGN PATENT DOCUMENTS

JP  02000120509 A * 4/2000

* cited by examiner

*Primary Examiner*—Davis Hwu
(74) *Attorney, Agent, or Firm*—Liell & McNeil

(57) ABSTRACT

A fluid control valve assembly controls the flow of actuation fluid to and from a fuel injector. The fluid control valve assembly includes at least one solenoid actuator attached to a valve body. The solenoid actuator includes a stator and an armature comprised of a soft magnetic material. At least one of the armature and the stator include an impact surface. The impact surface is coated with a relatively hard, nonmagnetic material coating. Thus, the relatively hard, nonmagnetic material coating will protect the relatively soft, magnetic material comprising the stator and the armature, and increase the durability of the solenoid actuator and the fluid control valve assembly.

11 Claims, 3 Drawing Sheets ate the flow of actuation fluid to and from hydraulic devices, including but not limited to fuel injectors. Depending on the positioning of a valve member, the fluid control valve either connects the fuel injector to a source of high pressure actuation fluid causing the fuel injector to activate, or connects the fuel injector to a low pressure actuation reservoir causing the fuel injector to deactivate, reset itself, or remain inactive. Typically, the movement of the valve member is controlled by at least one solenoid actuator. For instance, hydraulically actuated fuel injectors, such as that shown in U.S. Pat. No. 6,161,770 issued to Sturman on Dec. 19, 2000, include a solenoid driven fluid control valve that is attached to an injector body.

HARD COATING OF AN IMPACT SURFACE OF A SOLENOID ACTUATOR AND FUEL INJECTOR USING SAME

TECHNICAL FIELD

The invention relates generally to solenoid actuators, and more particularly to a hard coating impact surfaces of solenoid actuators utilized with fuel injectors.

BACKGROUND

In several diesel engines today, fluid control valves regulate the flow of actuation fluid to and from hydraulic devices, including but not limited to fuel injectors. Depending on the positioning of a valve member, the fluid control valve either connects the fuel injector to a source of high pressure actuation fluid causing the fuel injector to activate, or connects the fuel injector to a low pressure actuation reservoir causing the fuel injector to deactivate, reset itself, or remain inactive. Typically, the movement of the valve member is controlled by at least one solenoid actuator. For instance, hydraulically actuated fuel injectors, such as that shown in U.S. Pat. No. 6,161,770 issued to Sturman on Dec. 19, 2000, include a solenoid driven fluid control valve that is attached to an injector body.

The Sturman fluid control valve includes a spool valve member that doubles as an armature. The armature is moveably positioned between a first solenoid actuator and a second solenoid actuator. Each solenoid actuator includes a solenoid coil mounted in a stator comprised of a relatively soft, magnetic material that aids in controlling the direction of the magnetic flux caused by the energized solenoid coil. Further, the armature/valve member is also comprised of a relatively soft, magnetic material that will be attracted to the energized solenoid coil. When the first solenoid coil is energized, the armature/valve member is attracted to and pulled in the direction of the first solenoid coil. Because the armature is included as part of the valve member, the valve member also moves in the direction of the energized solenoid coil. The armature/valve member stops when it impacts with stop surface on the first stator. When the second solenoid coil is energized, the armature, and thus the valve member, are pulled in the direction of the second solenoid actuator. The armature stops when it impacts with a stop surface on the second stator. Thus, when the armature is pulled toward the energized solenoid coil, regardless of whether the energized solenoid coil is the first or second solenoid coil, a stop surface of the armature/valve member impacts a stop surface of one of the stators. Thus, the relatively soft, magnetic materials comprising the stator and the armature will be subjected to repeated impacts, which may lead to undesirable wear and decrease the durability of the solenoid actuators and undermine the functioning and/or predictability of the valve.

The present invention is directed to overcoming one or more of the problems as set forth above.

SUMMARY OF THE INVENTION

In one aspect of the present invention, a fuel injector includes a solenoid actuator attached to a fuel injector body. The solenoid actuator includes a stator and a moveable armature, which are both comprised of a relatively soft material. At least one of the stator and the armature includes at least one impact surface with a relatively hard material coating.

In another aspect of the present invention, a valve assembly includes at least one solenoid actuator attached to a valve body. The solenoid actuator includes a stator and a moveable armature, which are both comprised of a relatively soft material. At least one of the stator and the armature includes at least one impact surface with a relatively hard material coating.

In yet another aspect of the present invention, there is a method of increasing the durability of a solenoid actuator by coating an impact surface of at least one of a stator and an armature comprised of relatively soft component. The coating includes a relatively hard material.

DETAILED DESCRIPTION

Figure 1:
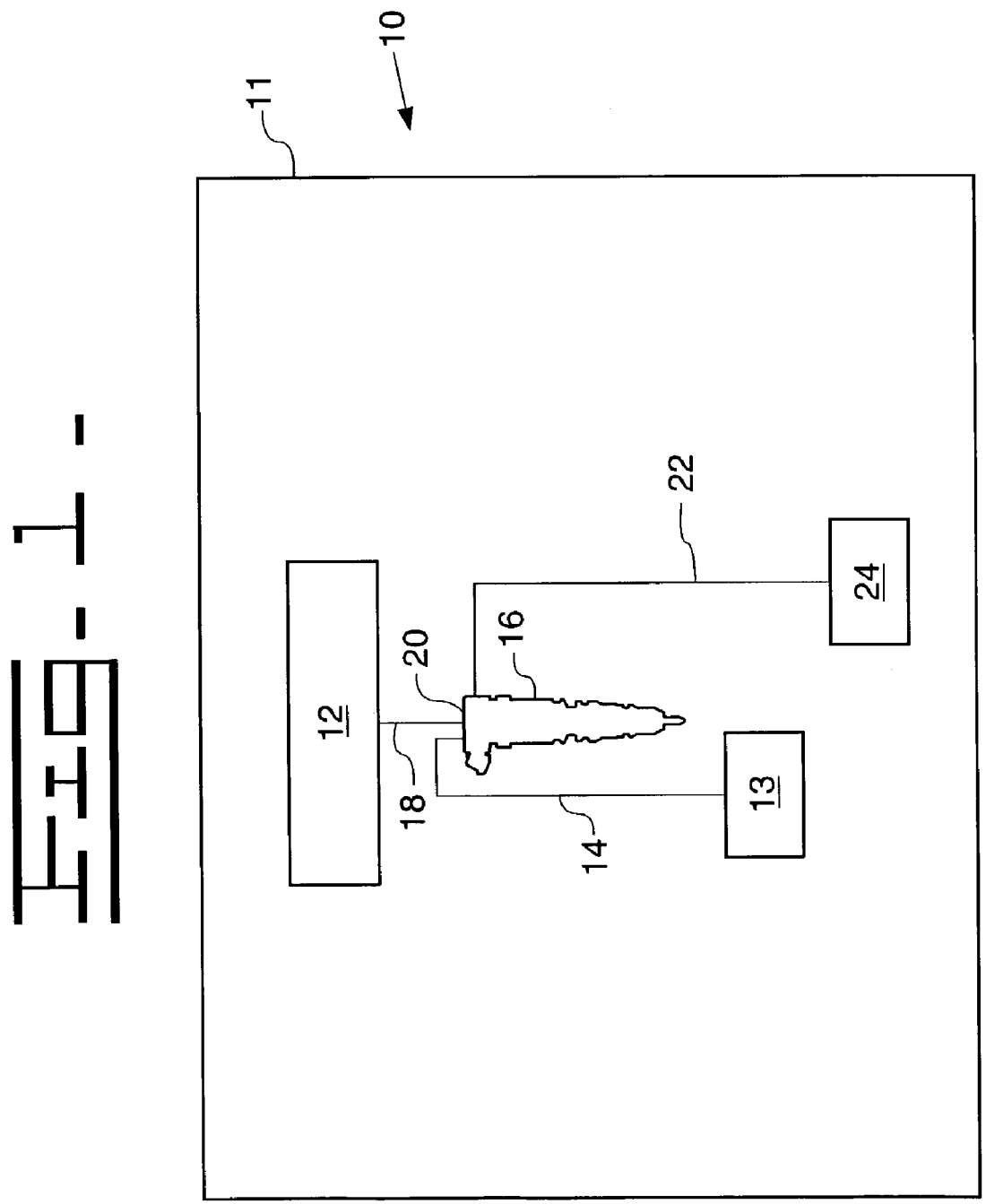
FIG. 1 is a schematic representation of an engine according to the present invention.

Referring to FIG. 1, there is shown a schematic representation of an engine 10 according to the present invention. The engine 10 includes an engine housing 11, to which a low pressure actuation fluid reservoir 13 is attached. The low pressure actuation fluid reservoir 13 preferably is an engine sump that includes an amount of low pressure engine lubricating oil. While low pressure actuation fluid reservoir 13 is preferably an oil pan that has engine lubricating oil, it should be appreciated that other fluid sources having an amount of available fluid, such as coolant, transmission fluid or fuel, could instead be used. A source of high pressure actuation fluid 12 is also attached to the engine housing 11. High pressure actuation fluid flowing out of the source of high pressure actuation fluid 12 is delivered to a fuel injector 16 via a fuel injector supply line 18. Once the high pressure actuation fluid has performed its work in the fuel injector 16, the actuation fluid is returned to the low pressure actuation fluid reservoir 13 via a fuel injector drain line 14. The fuel injector 16 includes a fluid control valve assembly 20 that controls the flow of actuation fluid entering the fuel injector 16 via the supply line 18 and exiting the fuel injector 16 via the drain line 14. The fuel injector fluid control valve assembly 20 is in electrical communication with an electronic control module 24 via a fuel injector communication line 22. Although the fluid control valve assembly 20 is illustrated in FIG. 1 as attached to the fuel injector 16, those skilled in the art should appreciate that the fluid control valve assembly 20 could be separate from the fuel injector 16 and positioned elsewhere within the hydraulic system, such as along the supply line 18. Further, those skilled in the art should appreciate that the fluid control valve assembly 20 can be utilized to control the flow of actuation fluid to and from any hydraulic device, including but not limited to an engine brake. In addition, rather than utilizing the fluid control valve assembly 20 for the fuel injector 16 and another for the engine brake, one valve assembly could control the flow of actuation fluid to and from both the fuel injector 16 and the engine brake.

Figure 2:
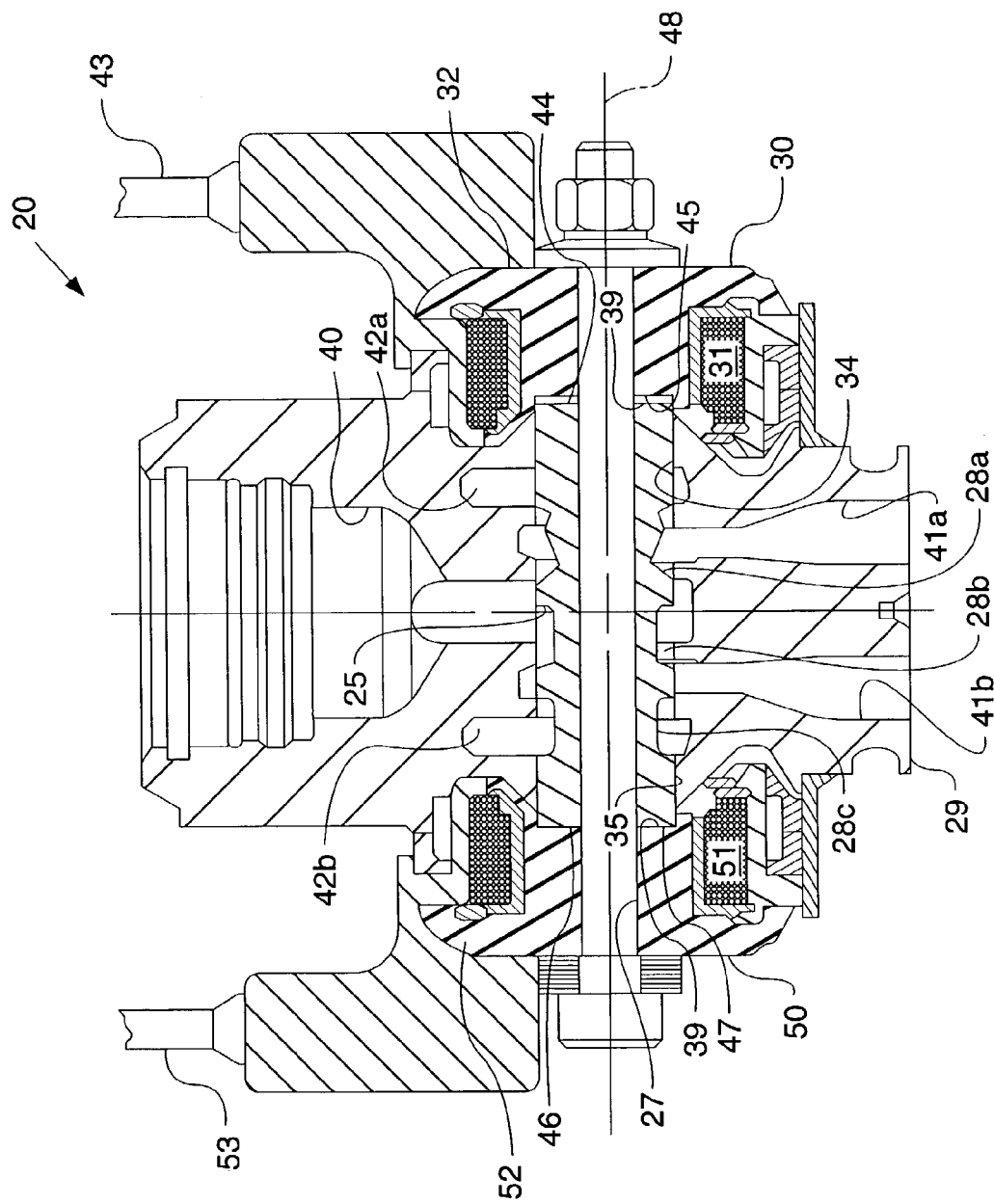
FIG. 2 is a sectioned side diagrammatic view of a valve assembly according to the present invention.

Referring to FIG. 2, there is shown a sectioned side view of the valve assembly 20, according to the present invention. The valve assembly 20 includes a first solenoid actuator 30, a second solenoid actuator 50, and a spool valve member 25. The fluid control valve assembly 20 includes a valve body 29 to which the first solenoid actuator 30 and the second solenoid actuator 50 are preferably attached. Electric current is provided to actuators 30 and 50 via electrical connectors 43 and 53, respectively. Although the present invention is illustrated as including two solenoid actuators, it should be appreciated that there could be any number of solenoid actuators, including one. The first solenoid actuator 30 includes a first solenoid coil 31 that is mounted in a first stator 32, which is comprised of a relatively soft, magnetic material. Likewise, the second solenoid actuator 50 includes a second solenoid coil 51 that is mounted in a second stator 52 which is also comprised of the relatively soft, magnetic material. Although the stators 32 and 52 are preferably a soft magnetizable steel, they can be comprised of any suitable relatively soft, magnetic material that can channel the magnetic flux created by the solenoid actuators 30 and 50, respectively. The inner surfaces of the valve body 29 and the stators 32 and 52 define a cylindrical guide bore 34, in which an armature 35 is moveably positioned. The armature 35, which is part of valve member 25, is comprised of a relatively soft, magnetic material such that when one of the solenoid coils 31 or 51 is energized, the armature 35 is attracted to the energized solenoid coil 31 or 51. The armature 35 is moveable within the guide bore 34 between a first position and a second position. When in the first position, the armature 35 is adjacent to the first solenoid coil 31, and a first stop surface 44 of the armature 35 is in contact with a first stop 45 of the first stator 32. Thus, the first stop surface 44 of the armature 35 and the first stop 45 of the first stator 32 include impact surfaces, herein referred to as the first impact surfaces. When the armature 35 is in the second position, as shown in FIG. 2, the armature 35 is adjacent to the second solenoid coil 51, and a second stop surface 46 of the armature 35 is in contact with a second stop 47 of the second stator 52. Thus, the second stop surface 46 of the armature 35 and the second stop 47 of the second stator 52 include second impact surfaces. Although the armature 35 impacts with the stators 32 and 52, it should be appreciated that the valve 21 could include stops that are separate from the stators 32 and 52. Thus, when the armature 35 moved to the first or second position, the stop surfaces 44 and 46 would come in contact with the separate stop rather than the stators 32 and 52.

According the present invention, in order to reduce potential problems associated with the impact between the stops 45 and 47 of the relatively soft, magnetic stators 32 and 52 and the stop surfaces 44 and 46 of the relatively soft, magnetic armature 35, at least one of the impact surfaces 44, 45, 46 and 47 are coated with a relatively hard, nonmagnetic material coating 39. Although any relatively hard, nonmagnetic material coating could be attached to the impact surfaces, the relatively hard, nonmagnetic material coating 39 preferably includes tungsten carbide. Tungsten carbide is preferred because, during manufacturing, it can be uniformly applied in a thin layer, maybe on the order of about two microns thick, to one or all of the impact surfaces 44, 45, 46 and 47 of the stators 32 and 52 and of the armature 35.

Referring still to FIG. 2, the fluid control valve assembly 20 includes a moveable spool valve member 25, which preferably includes the armature 35. However, it should be appreciated that the present invention contemplates an electronically controlled valve in which the valve member is operably coupled to move with the armature rather than including the armature. Although the valve member 25 is illustrated as spool valve member, it should be appreciated that the valve member 25 could be of a different shape or type, such as a poppet valve member. Further, it should be appreciated that the valve body 29 and the spool valve member 25 could define any number of passages, even though the present invention is described for a three way valve. The spool valve member 25 defines a first annulus 28a, a second annulus 28b, a third annulus 28c, and an internal passage 27. The valve body 29 defines a supply passage 40, a first drain passage 42a, a second drain passage 42b, a first actuation passage 41a and a second actuation passage 41b. The supply passage 40 is in fluid communication with the source of high pressure actuation fluid 12. The drain passages 42a and 42b are in fluid communication with the low pressure reservoir 13. It should be appreciated that the spool valve member 25 is unbiased, in that it moves between the first position and second position by the force of the energized solenoid actuators 30 and 50 without the force of a spring or other similar biasing forces. Nevertheless, the present invention also contemplates biased valves. The spool valve member 25 preferably moves along a centerline 48 of the valve assembly 20. When the spool valve member 25 is in the first, or closed, position, a spool valve member body 26 blocks fluid communication between the supply passage 40 and the actuation passages 41a and 41b. However, the first drain passage 42a is in fluid communication with the first actuation passage 41a via the first annulus 28a, and the second drain passage 42b is in fluid communication with the second actuation passage 41b via the third annulus 28c. When the spool valve member 25 is in the second, or open, position, as illustrated in FIG. 2, the supply passage 40 is in fluid communication with the first actuation passage 41a via the first annulus 28a, and in fluid communication with the second actuation passage 41b via the second annulus 28b. When the spool valve member 25 is in the second position, the spool valve member body 26 blocks communication between the first drain passage 42a with the first actuation passage 41a and the second drain passage 42b with the second actuation passage 41b, respectively.

Figure 3:
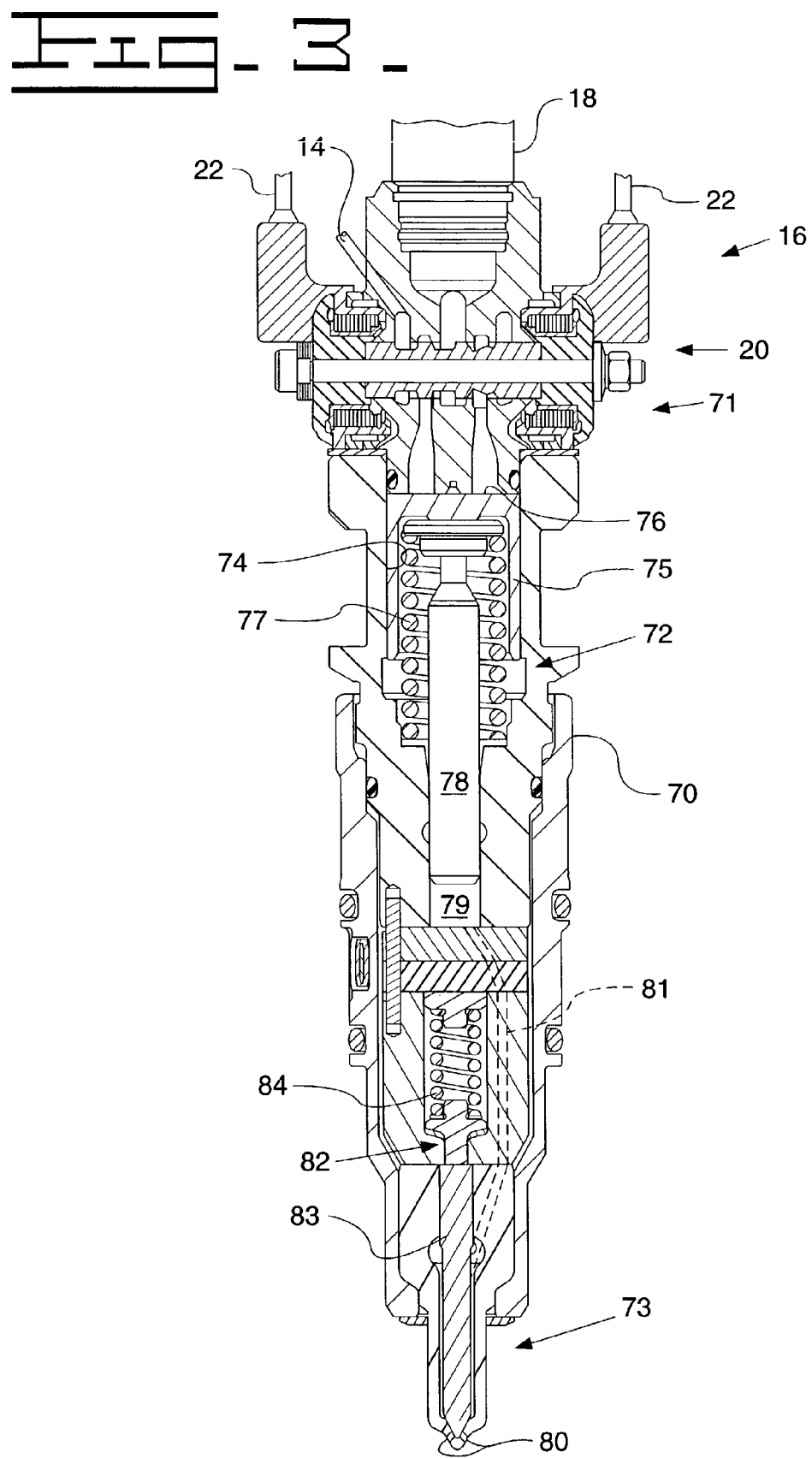
FIG. 3 is a sectioned side diagrammatic view of a fuel injector according to the present invention.

Referring to FIG. 3, there is shown a sectioned side diagrammatic view of the fuel injector 16 according to the present invention, which includes the valve assembly of FIG. 2. The injector body 70 includes a flow control portion 71, a pressure intensifying portion 72, and a nozzle portion 73. The control portion 71 includes the fluid control valve assembly 20, which is attached to the injector body 70. The actuation passages 41a and 41b of the fluid control valve assembly 20 are fluidly connected to a piston bore 74 which is defined by the injector body 70. An intensifier piston 75 is movably positioned within the piston bore 74 and has a piston hydraulic surface 76 that is exposed to fluid pressure flowing from the actuation passages 41a and 41b to the piston bore 74. The intensifier piston 75 is biased toward a retracted, upward position as shown by a biasing spring 77. A plunger 78 is also moveably positioned in the injector body 70 and moves in a corresponding manner with the intensifier piston 75. When the spool valve member 25 is in its second position, as illustrated, and the actuation passages 41a and 41b of the fluid control valve 21 are in fluid communication with the source of high pressure actuation fluid 12, the pressure acting on the piston hydraulic surface 76 is high, and the intensifier piston 75 is moved toward its advanced position. The plunger 78 also advances and acts to pressurize fuel within a fuel pressurization chamber 79. When the spool valve member 25 is in its first position and the actuation passages 41a and 41b of the flow control valve 21 are in fluid communication with the low pressure actuation reservoir 13, the pressure acting on the piston hydraulic surface 76 is low and the intensifier piston 75 stays in, or moves toward, its retracted, upward position under the action of the biasing spring 77. When the plunger 78 is returning to the upward position, fuel is draw into the fuel pressurization chamber 79 in preparation for the next injection event. The fuel pressurization chamber 79 is fluidly connected to nozzle outlets 80 via a nozzle supply passage 81. The opening and closing of the nozzle outlets 80 is controlled by a needle valve 82 positioned in the nozzle portion 73 of the injector body 70. The needle valve 82 includes a needle valve member 83 biased to a closed position by a spring 84. Pressurized fuel within the nozzle supply passage 81 will act on an opening hydraulic surface of the needle valve member 83. When the pressure within the nozzle supply passage 81 reaches a valve opening pressure, the needle valve member 83 will move against the bias of the spring 84 and open the nozzle outlets 80.

INDUSTRIAL APPLICABILITY

Referring to FIGS. 1–3, the fluid control valve assembly 20 controls the flow of actuation fluid to and from the fuel injector 16. Although the operation of the present invention will be discussed for one fuel injector 16, it should be appreciated that the present invention can be utilized in an engine having any number of fuel injectors 16, and could be utilized to control the flow of fluid to and from any hydraulic device, such as an engine brake. Further, although the present invention will be discussed for the valve assembly 20 including two solenoid actuators 30 and 50, it should be appreciated that the present invention can be applied in any valve including at least one solenoid actuator. In addition, the present invention can be utilized in a valve in which the armature and the spool valve member are separate components.

Referring to FIGS. 1–3, the application of the present invention with the fuel injector 16 will be discussed. Prior to an injection event, the electronic control module 24 will have supplied electric current to the first solenoid actuator 30, causing the armature 35 to be attracted to the first solenoid coil 31. Thus, the armature 35 and the spool valve member 25 will be in the first, or the closed, position in which the first stop surface 44 of the armature 35 is resting against the first stop 45 of the first stator 32. The relatively hard, nonmagnetic material coatings 39 attached to the first stop surface 44 and the first stop 44 will be in contact. In the first position, the first annulus 28a and the third annulus 28c of the spool valve member 25 are positioned such that the drain passages 42a and 42b are in fluid communication with the piston bore 74. Thus, because there is low pressure acting on the piston hydraulic surface 76 of the intensifier piston 75, the intensifier piston 75 and the operably coupled plunger 78 remain in their biased position and do not pressurize fuel within the fuel pressurization chamber 79.

In preparation for an injection event, the electronic control module 24 will energize the second solenoid actuator 50 via the fuel injector communication line 22. Electric current will be passed through the second solenoid coil 51 creating a magnetic flux that attracts the armature 35. The armature 35 and the spool valve member 25 will move to the second, or open, position, as illustrated in FIG. 2. When the armature 35 is in the second position, the second stop surface 46 of the armature 35 is in contact with the second stop 47 of the second stator 52. Thus, the second stop surface 46 and the second stop 47 include impact surfaces. Because the relatively hard, nonmagnetic material coating 39 including tungsten carbide is attached to the second stop surface 46 and the second stop 47, when the second stop surface 46 impacts the second stop 47, the coating 39 protects the relatively soft, magnetic material comprising the armature 35 and the second stator 52. Those skilled in the art will recognize that sufficient protection may be afforded by coating only one of a pair of impact surfaces. The potential harm caused by the repeated impacts between the relatively soft magnetic material comprising the armature 35 and the second stator 52 is reduced. By protecting the relatively soft, magnetic material comprising the armature 35 and/or the second stator 52 each instance the armature 35 reaches its second position, the durability and longevity of the stator 52 and the armature 35 can be increased.

Because the armature 35 is at least a portion of the spool valve member 25, the spool valve member 25 moves in a corresponding manner with the armature 35. Thus, in preparation for the fuel injection event, the spool valve member 25 is moved to the second position. When the spool valve member 25 is in the second position, the supply passage 41 is in fluid communication with the first actuation passage 41a and the second actuation passage 41b via the first annulus 28a and the second annulus 28b, respectively. The body 26 of the spool valve member 25 is blocking fluid communication between the actuation passages 41a and 41b and the drain passages 42a and 42b. The actuation fluid will flow from the source of high pressure actuation fluid 12 to the supply passage 41 via the supply line 14. The high pressure actuation fluid can then flow via the first and second annuluses 28a and 28b to the first and second actuation passages 42a and 42b, respectively. From the first and second actuation passages 42a and 42b, the high pressure actuation fluid flows to the piston bore 74 where it acts upon the piston hydraulic surface 76 causing the intensifier piston 75 and the plunger 78 to advance to their downward position against the bias of the spring 77. After the plunger 58 pressurizes fuel within the fuel pressurization chamber 79, the fuel flows into the nozzle supply passage 81 and acts on the opening hydraulic surface of the needle valve member 83. When the pressurized fuel overcomes the bias of the spring 84, the needle valve member 83 will move to an open position and open the nozzle outlets 80.

Once the fuel within the fuel pressurization chamber 79 is pressurized and pushed through the nozzle supply passage 72 to the nozzle outlets 80, the electronic control module 24 will stop the flow of electric current through the second solenoid coil 51 via the fuel injector communication line 22 and the connector 43. In other words, neither actuator is energized during most of each injector event, due to magnetic latching and lack of a biasing force on the valve member. The electronic control module 24 will send electric current through the first solenoid coil 31 via the fuel injector communication line 22. The magnetic flux created by the energized first solenoid coil 31 will be greater than any remaining magnetic attraction between the de-energized second solenoid coil 51 and the armature 35. The armature 35 included within the spool valve member 25 will move toward its first position, in which the armature 35 is adjacent to the first solenoid coil 31. The first stop surface 44 of the armature 35 will impact with the first stop 45 of the first stator 32. The relatively hard nonmagnetic material coating 39, preferably including tungsten carbide, attached to the first stop surface 44 and the first stop 45 will protect the relatively soft, magnetic material of the armature 35 and the first stator 32 upon impact. The potential damage from repeated impacts between the relatively soft magnetic material comprising the armature 35 and the second stator 22 is reduced. By protecting the relatively soft, magnetic material comprising the armature 35 and/or the second stator 52 each instance the armature 35 reaches its first position, the durability and longevity of the stator 32 and the armature 35 can be increased.

When the armature 35, and thus the spool valve member 25, is in the first position, the first actuation passage 41a is in fluid communication with the first drain passage 42a via the first annulus 28a. The second actuation passage 41b is in fluid communication with the second drain passage 41b via the third annulus 28c. The supply passage 40 and the second annulus 28b are blocked from fluid communication with the actuation passages 41a and 41b by the body 26 of the spool valve member 25. Thus, there will be low pressure acting on the piston hydraulic surface 76 of the intensifier piston 75 causing the intensifier piston 75 and the plunger 78 to retract upward due to the bias of the spring 77. At about the same time, fuel pressure drops and the needle valve closes. The actuation fluid within the piston bore 74 will drain to the low pressure actuation fluid reservoir 13 via the actuation passages 41a and 41b and the drain passages 42a and 42b. The upward movement of the plunger 78 and intensifier piston 75 will draw fuel into the fuel pressurization chamber 79 to prepare for the next injection event. The process will then repeat itself.

Overall, the present invention is advantageous because it increases the durability of the solenoid actuators 30 and 50. By attaching a relatively nonmagnetic, hard material 39 between the stops 45, 47 of the stators 32 and 52 and to the stop surfaces 44, 46 of the armature 35, the present invention reduces contact between the relatively soft, magnetic material of the stators 32 and 52 and the relatively soft, magnetic material of the armature 35. Because the relatively soft, magnetic material comprising the stators 32 and 52 and the armature 35 are not impacting one another during each fuel injection event, the wear, and potential deformation, on the stators 32 and 52 and the armature 35 is decreased, thereby allowing the stator 32 to better guide the movement of the armature 35 without excessive wear that could undermine its performance. Further, by coating the impact surfaces 44, 45, 46 and 47 with a thin layer, maybe on the order of two microns, of tungsten carbide, the durability of the solenoid actuators 30 and 50 can be increased without increasing the number of parts within the fluid control valve assembly 20.

In addition, the present invention is advantageous because the armature 35 is at least a portion of the spool valve member 25, thereby eliminating the need to operably couple the valve member 25 to move with the armature 35. This will reduce the number of valve assembly components and the risk of misalignment of the valve member 25 during operation of the valve assembly 20. Moreover, this present invention is advantageous because it can be used in any valve assembly operating in various methods. Because the stator and the armature are general components of a solenoid actuator, depending on the operating method of the valve assembly, the stator and the armature may impact other valve assembly components, including but not limited to the valve member. Thus, coating their impact surfaces with a relatively hard, nonmagnetic material protects the stator and the armature not only from impact with one another but from impact that may occur with any other component of the valve assembly. Although the application of the present invention has been illustrated within the fuel injector 16, those skilled in the art should appreciate that the present invention is applicable as an electrical actuator for any suitable purpose, such as a hydraulic device using a solenoid actuator.

It should be understood that the above description is intended for illustrative purposes only, and is not intended to limit the scope of the present invention in any way. Thus, those skilled in the art will appreciate that other aspects, objects, and advantages of the invention can be obtained from a study of the drawings, the disclosure and the appended claims.

What is claimed is:

1. A fuel injector comprising:
   a fuel injector body;
   a first solenoid actuator attached to the injector body and including a first stator and a moveable armature comprised of a relatively soft material; at least one of the first stator and the armature including at least one first impact surface with a relatively hard material coating
   a second solenoid actuator attached to the injector body includes a second stator comprised of the relatively soft material; the second stator and the armature including at least one second impact surface; and the second impact surface including the relatively hard material coating; and
   the armature being moveable between a first position adjacent the first stator, and a second position adjacent the second stator.

2. The fuel injector of claim 1 wherein the armature includes a first stop surface and a second stop surface;
   when the armature is in the first position, the first stop surface of the armature is in contact with a first stop of the first stator; and when the armature is in the second position, the second stop surface of the armature is in contact with a second stop of the second stator.

3. The fuel injector of claim 2 wherein the at least one impact surface includes at least one of the first stop of the stator, the second stop of the stator, the first stop surface of the armature, and the second stop surface of the armature.

4. The fuel injector of claim 3 wherein the armature is at least a portion of a valve member.

5. The fuel injector of claim 4 wherein the valve member is a spool valve member.

6. The fuel injector of claim 5 wherein the valve member is a portion of a three way valve.

7. The fuel injector of claim 6 wherein the relatively hard, nonmagnetic coating includes tungsten carbide.

8. A valve assembly comprising:
   a valve body;
   at least one solenoid actuator being attached to the valve body;
   a first solenoid actuator including a first stator and a moveable armature comprised of a relatively soft material;
   at least one of the first stator and the armature including at least one impact surface with a relatively hard material coating;
   wherein the armature is at least a portion of a valve member;
   the valve member being moveable in the valve body between a first position and a second position, and including a first stop surface and a second stop surface; and
   a second solenoid actuator includes a second stator comprised of the relatively soft material; at least one of the second stator and the armature including at least one second impact surface with a relatively hard material coating.

9. The valve assembly of claim 8 wherein the stator of the first solenoid actuator includes a first stop, and the second stator of the second solenoid actuator includes a second stop; and
   when the armature is in the first position, a first stop surface of the armature is in contact with the first stop; and when the armature is in the second position, the second stop surface of the armature is in contact with the second stop.

10. The valve assembly of claim 9 wherein the at least one impact surface of the first solenoid actuator includes at least one of the first stop surface of the armature and the first stop of the stator; and
    the at least one second impact surface of the second solenoid actuator includes at least one of the second stop surface of the armature and the second stop of the second stator.

11. The valve assembly of claim 10 wherein the relatively hard material coating includes tungsten carbide;
    the valve member is a spool valve member; and
    the valve body and the valve member are portions of a three way valve.

* * * * *